United States Patent
Hsiao et al.

(10) Patent No.: US 8,687,681 B2
(45) Date of Patent: Apr. 1, 2014

(54) RECEIVER AND SIGNAL TESTING METHOD THEREOF

(71) Applicant: VIA Technologies, Inc., New Taipei (TW)

(72) Inventors: Chin-Fa Hsiao, New Taipei (TW); Shih-Min Lin, New Taipei (TW)

(73) Assignee: VIA Technologies, Inc., New Taipei (TW)

( * ) Notice: Subject to any disclaimer, the term of this patent is extended or adjusted under 35 U.S.C. 154(b) by 0 days.

(21) Appl. No.: 13/861,216

(22) Filed: Apr. 11, 2013

(65) Prior Publication Data

US 2013/0230132 A1    Sep. 5, 2013

Related U.S. Application Data

(63) Continuation of application No. 11/819,537, filed on Jun. 28, 2007, now abandoned.

(30) Foreign Application Priority Data

Sep. 4, 2006 (TW) .............................. 95132602 A

(51) Int. Cl.
*H04B 3/46* (2006.01)
*H04B 17/00* (2006.01)
*H04Q 1/20* (2006.01)

(52) U.S. Cl.
USPC ........................................................ 375/224

(58) Field of Classification Search
USPC ........................................................ 375/362
See application file for complete search history.

(56) References Cited

U.S. PATENT DOCUMENTS

| | | |
|---|---|---|
| 4,504,942 A | 3/1985 | Aro et al. |
| 6,246,348 B1 | 6/2001 | Moscatelli |
| 8,086,922 B1 | 12/2011 | Camarota |
| 2002/0186086 A1 | 12/2002 | Curiger et al. |
| 2003/0025960 A1 | 2/2003 | Benvenuti et al. |
| 2003/0174798 A1 | 9/2003 | Pickering et al. |
| 2004/0083077 A1 | 4/2004 | Baumer et al. |
| 2004/0103083 A1 | 5/2004 | Gaur et al. |
| 2005/0201500 A1 | 9/2005 | Shizuki |
| 2006/0129722 A1 | 6/2006 | Campbell |
| 2007/0224958 A1 | 9/2007 | Nedachi |
| 2008/0010568 A1 | 1/2008 | Kushnick |

FOREIGN PATENT DOCUMENTS

| | | |
|---|---|---|
| EP | 1061453 | 12/2000 |
| TW | 1221984 | 10/2004 |
| TW | 1235922 | 7/2005 |
| WO | WO 2005/082106 A2 | 9/2005 |

OTHER PUBLICATIONS

Official Action in Taiwan Application No. 095132602 dated Mar. 24, 2010.

*Primary Examiner* — Erin File
(74) *Attorney, Agent, or Firm* — Bacon & Thomas, PLLC

(57) ABSTRACT

A receiver includes a CDR circuit, serial-to-parallel converter, and test module. The CDR circuit is for receiving the test signal groups inputted in series and following transmitting frequency of the test signal groups to obtain a clock signal, wherein the clock signal is used to provide an operational frequency of the receiver. The serial-to-parallel converter is for receiving the test signal groups outputted by the CDR circuit and converting the serially-inputted test signal groups into a plurality of test bytes outputted in parallel, wherein each of the test bytes has multi-bit data. The test module is for receiving the test bytes and the clock signal and comparing two adjacent bytes of the test bytes to determine whether the two adjacent test bytes are completely the same.

13 Claims, 5 Drawing Sheets

RECEIVER AND SIGNAL TESTING METHOD THEREOF

This is a Continuation of co-pending U.S. application Ser. No. 11/819,537, filed Jun. 28, 2007, which claims the benefit of Taiwan application Serial No. 95132602, filed Sep. 4, 2006, the subject matter of which is incorporated herein by reference.

BACKGROUND OF THE INVENTION

1. Field of the Invention

The invention relates in general to a receiver, and more particularly to a receiver of data in series and signal testing method thereof.

2. Description of the Related Art

Referring to FIG. 1A a schematic diagram of a conventional loop test operation is shown. A south-bridge chip 100 with a serial advanced technology attachment (SATA) interface includes a receiver 112 and a transmitter 114. In the prior-art technology, a test signal D1 is continuously outputted from the transmitter 114 to the receiver 112 to achieve the purpose of loop testing. In the process of transmitting the test signal D1, the transmitter 114 transmits only a part of data of the test signal D1 to the receiver 112. Therefore, the clock/data recovery (CDR) circuit of the receiver 112 will follow and use the frequency of the transmitter in transmitting the test signal D1 as its own operational frequency.

Referring to FIG. 1B, a schematic diagram of an example for transmitting the test signal in FIG. 1A is shown. In order to test the correctness of the test signal D1 outputted from the transmitter 114 to the receiver 112, a conventional method is to design a number of buffers 10 in the transmitter 114. The buffers 10 are for recording patterns A1~An of several to-be-tested signals beforehand. When the test signal D1 is transmitted from the transmitter 114 to the receiver 112, the test signal D1 is compared with the stored patterns A1~An of the to-be-tested signals to determine whether the test signal D1 is received successfully.

In the conventional loop testing method, buffers of the receiver are used to store the patterns of the to-be-tested signals beforehand. Extra buffers are disposed in the transmitter will increase the circuit cost and power consumption in a whole in addition to increasing difficulty of circuit design. These are all drawbacks of the conventional loop testing method. Therefore, how to effectively and correctly test functions of the receiver is an essential subject in the relevant industry.

SUMMARY OF THE INVENTION

The present invention relates to a receiver, the receiver is for receiving a plurality of test signal groups, and each of the test signal groups has multi-bit of data. The receiver comprises a CDR circuit, serial-to-parallel converter, and test module. The CDR circuit is for receiving the test signal groups inputted in series and following transmitting frequency of the test signal groups to obtain a clock signal, wherein the clock signal is used to provide an operational frequency of the receiver. The serial-to-parallel converter is for receiving the test signal groups outputted by the CDR circuit and converting the serially-inputted test signal groups into a plurality of test bytes outputted in parallel, wherein each of the test bytes has multi-bit of data. The test module is for receiving the test bytes and the clock signal and comparing two adjacent bytes of the test bytes to determine whether the two adjacent test bytes are completely the same.

Moreover, the present invention relates to a signal testing method, the signal testing method is applied to a receiver for receiving a plurality of test signal groups, and each of the test signal groups has multi-bit of data. The signal testing method comprises converting the test signal groups into a plurality of test byte outputted in parallel, wherein each of the test byte has multi-bit of data; and comparing two adjacent bytes of the test bytes to determine whether the two adjacent test bytes are completely the same.

Furthermore, the present invention relates to a data testing system, the data testing system comprises an outer apparatus and a receiver. The outer apparatus is for transmitting a plurality of test signal groups. The receiver is for receiving the test signal groups, and each of the test signal groups has multi-bit of data. The receiver comprises a serial-to-parallel converter and test module. The serial-to-parallel converter is for receiving the test signal group and converting the serially-inputted test signal groups into a plurality of bytes outputted in parallel, wherein each of the test bytes has multi-bit of data. The test module is for receiving the test bytes, and comparing two adjacent bytes of the test bytes to determine whether the two adjacent test bytes are completely the same.

The invention will become apparent from the following detailed description of the preferred but non-limiting embodiments. The following description is made with reference to the accompanying drawings.

DETAILED DESCRIPTION OF THE INVENTION

Figure 1A:
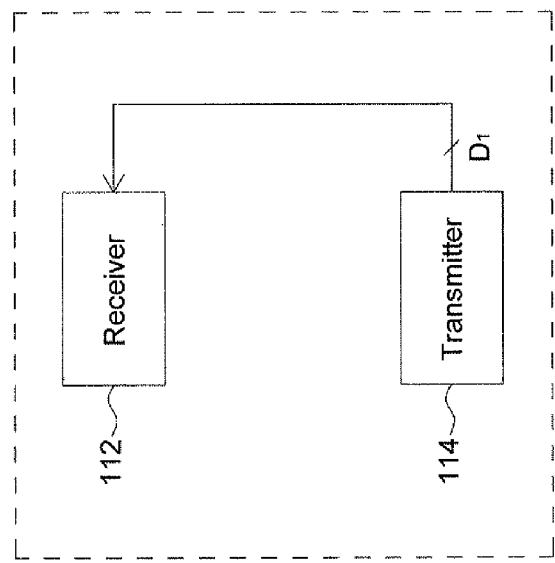
FIG. 1A (PRIOR ART) is a schematic diagram of a conventional loop test operation.
Figure 1B:
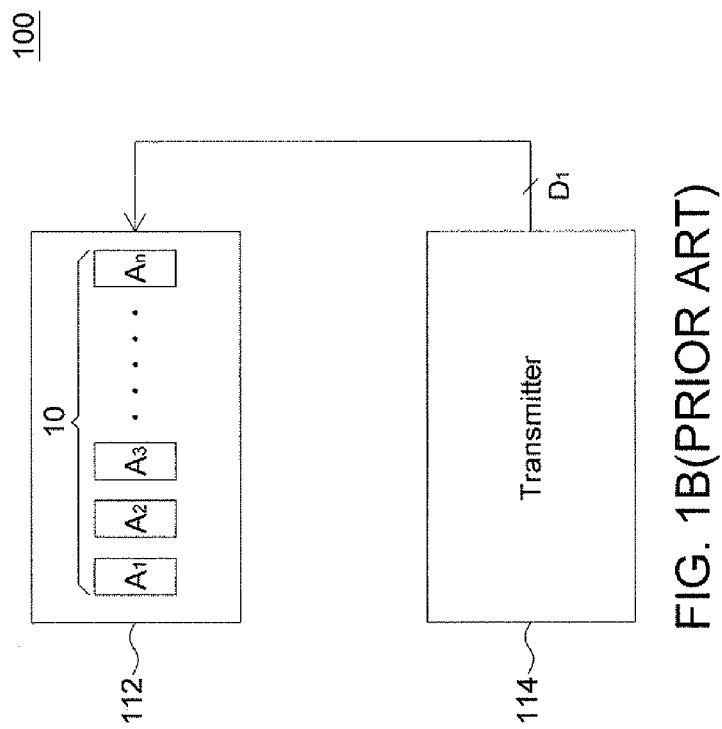
FIG. 1B (PRIOR ART) is a schematic diagram of an example for transmitting the test signal in FIG. 1A.
Figure 2:
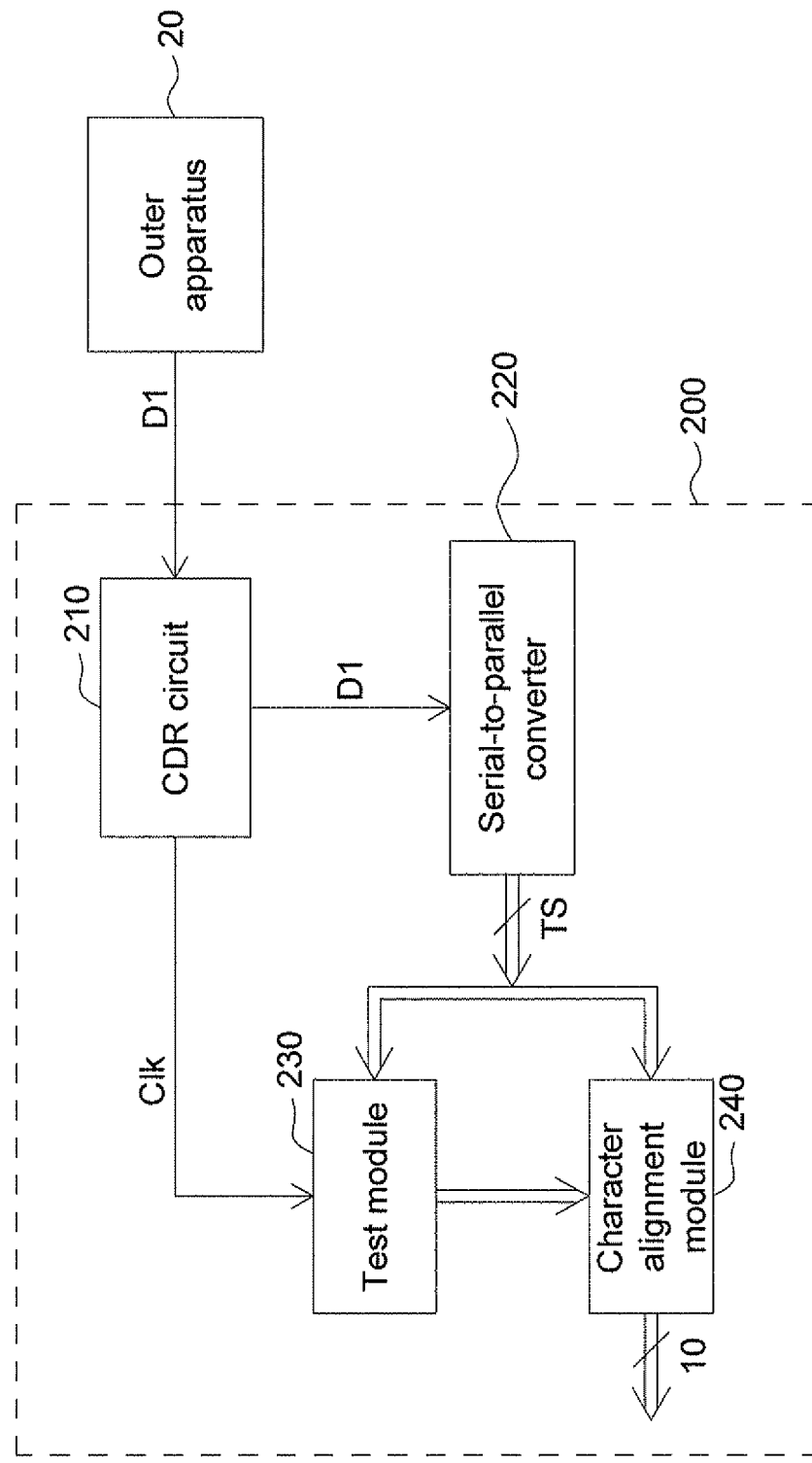
FIG. 2 is a block diagram of a receiver according to a preferred embodiment of the invention.

Referring to FIG. 2, a block diagram of a receiver according to a preferred embodiment of the invention is shown. A receiver 200, disposed in a chipset, such as a south-bridge chip, is for continuously receiving a number of test signal groups D1 with the same data content. Each test signal group D1, such as having data of 10 bits, is inputted in series from the outer apparatus 20 to the receiver 200. The receiver 200 and the outer apparatus 20 form a data testing system. The receiver 200 includes a CDR circuit 210, serial-to-parallel converter 220, and test module 230. The receiver 200 further includes a character alignment module 240. The CDR circuit 210 is for continuously receiving the serially inputted test signal groups D1 and following the transmitting frequency of the test signal groups D1 to obtain a clock signal Clk. The clock signal Clk is used to provide an operational frequency of the receiver 200. The serial-to-parallel converter 220 receives the test signal groups D1 from the CDR circuit 210 and converts the serially inputted test signal groups D1 into a number of test bytes TS outputted in parallel. Owing that each of the test signal groups D1 has data of 10 bits, in a preferred embodiment, each test byte TS also has data of 10 bits. The test module 230 is for receiving the test bytes TS and clock signal Clk, and comparing the present test byte TS(1) and the next test byte TS(2) to determine whether data of the corresponding bits of the two test bytes TS(1) and TS(2) is completely the same. If the data in each corresponding bit of the two test bytes TS(1) and TS(2) is the same, it represents the receiver 200 has a normal operation.

Figure 3:
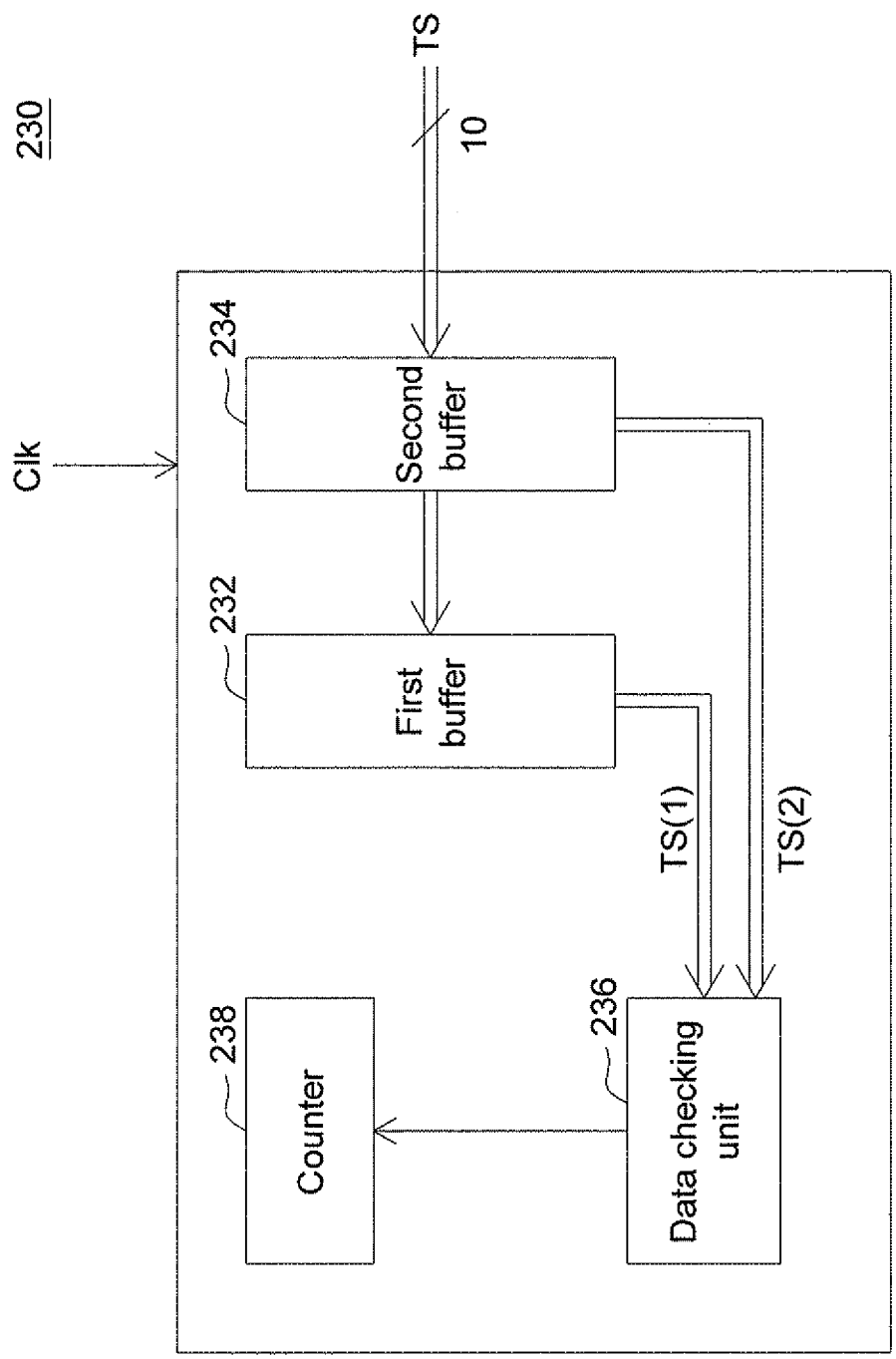
FIG. 3 is a block diagram of the test module 230 according to the preferred embodiment of the invention.

How the test module 230 achieves the purpose of signal testing will be further illustrated in details. Referring to FIG. 3, a block diagram of the test module 230 according to the preferred embodiment of the invention is shown. The test module 230 includes a first buffer 232, second buffer 234, data checking unit 236 and counter 238. The first buffer 232 is for registering the present test byte TS(1) and the second buffer 234 is for registering the next test byte TS(2). The data checking unit 236 is for receiving the present test byte TS(1) and the next test byte TS(2) and comparing whether data of the corresponding bits of the two test bytes TS(1) and TS(2) is completely the same. The counter 238 is for recording a number of the bits of the present test bytes TS(1) whose data differs from the data of the corresponding bits of the next test bytes TS(2). When the first test byte TS(1) has completely the same data in the corresponding 10 bits as the second test byte TS(2), it represents the receiver 200 is operated normally and can correctly receive test signals. Afterward, the test module 230 outputs the compared first test byte TS(1) to the character alignment module 240, shifts the second test byte TS(2) to the first buffer 232 and registers the third test byte TS(3) in the second buffer 234. In this way, the test module 230 can continuously compare the second test byte TS(2) and the third test byte TS(3). In a preferred embodiment, the third test byte TS(3) is the next second test byte after the first test byte TS(1).

When the first test byte TS(1) has different data in any one of the corresponding 10 bits from the second test byte TS(2), the counter 238 adds 1 to an error record value. If the error record value of the counter 238 reaches a predetermined number, such as a threshold value, it is determined that the receiver 200 has an error operation. In this situation, every setting, such as parameter setting, of the receiver 200 can be adjusted again and then the receiver 200 is tested again to find out suitable parameter settings for the receiver 200. The error record value, a threshold value, can be determined according to a practical operation situation.

When the receiver 200 is operated normally, that is, not in a test state, the character alignment module 240 is for comparing the received bytes with the lookup tables (not shown in the figure) stored therein so as to convert the received byte into a corresponding word. When the receiver 200 is set in a test state, the character alignment module 240 is for receiving the compared test bytes TS and registering new test bytes into the first buffer 232 and the second buffer 234 for a new comparison.

Figure 4:
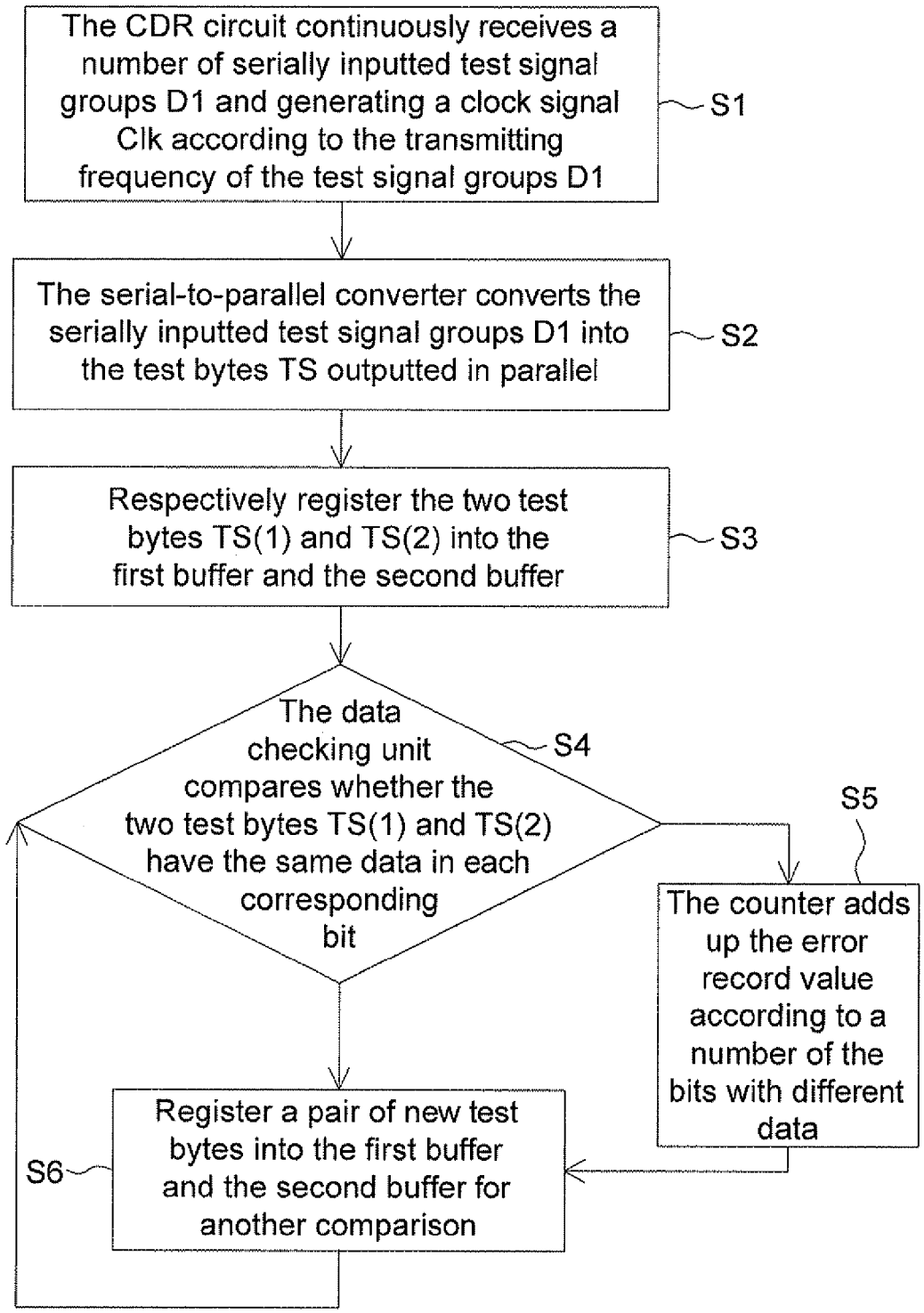
FIG. 4 is a flowchart of a signal testing method according to a preferred embodiment of the invention.

FIG. 4 is a flowchart of a signal testing method according to a preferred embodiment of the invention. Referring to FIGS. 2, 3 and 4 simultaneously, in step S1, the CDR circuit 210 continuously receives a number of serially inputted test signal groups D1 and generating a clock signal Clk according to the transmitting frequency of the test signal groups D1 for providing an operational frequency of the receiver 200. In step S2, the serial-to-parallel converter 220 converts the serially inputted test signal groups D1 into the test bytes TS outputted in parallel. The test byte TS can have the same number of data bits as the test signal group D1.

In step S3, respectively register the two test bytes TS(1) and TS(2) into the first buffer 232 and the second buffer 234. In step S4, the data checking unit 236 compares the two test bytes TS(1) and TS(2) to determine whether the data of each corresponding bit of the two test bytes TS(1) and TS(2) is the same. If the test bytes TS(1) and TS(2) have different bit data in the comparison result, the counter 238 adds up the error record value according to a number of the bits with different data as shown in step S5. After completing the comparison, proceed to the step S6 to register a pair of new test bytes into the first buffer 232 and the second buffer 234 for another comparison. The test byte TS(1) of the first buffer 232 will be outputted to the character alignment module 240, the test byte TS(2) be shifted to the first buffer 232 and the test byte TS(3) be registered into the second buffer 234. Then, return to the step S4 to compare and determine whether the test bytes TS (2) and TS(3) have the same data in each corresponding bit. The operation is performed by analogy until all the test bytes TS are compared.

If the comparison result shows that the test bytes TS(1) and TS(2) have no different bit data, the step S6 is entered directly after the comparison operation to perform a new comparison. After all the test bytes are compared, if the error record value of the counter 238 is located in a threshold value range, it represents the receiver 200 is operated normally. If the error record value exceeds the threshold value in the test process, it represents the receiver 200 has an error operation. Then, the comparison procedure can be stopped to reset the receiver 200.

The embodiment of the invention uses the test module to test whether the data in the corresponding bits of the two adjacent test signal groups is completely the same to determine the operational situation of the receiver. Compared to the prior-art method by which a number of buffers are added to the receiver to record a number test signal patterns, the testing method of the invention needs only a simply byte comparison procedure to complete the test process. The circuit design of the invention is simplified very much by using fewer buffers as compared to the prior-art method. Therefore, the circuit cost can be effectively reduced.

Besides, owing that the test signal groups received by the prior-art receiver should be compared with the test signal patterns of the buffers, the transmitter can only outputs the test signal groups and thus the control process of the transmitter and receiver becomes more complicated. Contrarily, the invention needs only to continuously transmit the same test signal group to the receiver, and thus does not have to perform a complicated control operation on the outer apparatus and receiver. The test signal groups can be generated more easily, the available content of test signal groups can be more flexible and diverse. Moreover, the testing method of the invention has also an advantage of quickly and accurately testing other characteristic information of the receiver, such as jitter existence or sensibility of the receiver.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A receiver, for receiving a plurality of test signal groups to test the receiver, each of the test signal groups having multi-bit of data, the receiver comprising:
   a clock/data recovery (CDR) circuit, for receiving the test signal groups inputted in series and following a transmitting frequency of the test signal groups to obtain a clock signal, wherein the clock signal is used to provide an operational frequency of the receiver;
   a serial-to-parallel converter, coupled to the CDR circuit to receive the test signal groups directly outputted by the CDR circuit and converting the serially-inputted test signal groups into a plurality of test bytes outputted in parallel, wherein each of the test bytes has multi-bit of data; and a test module, coupled to the serial-to-parallel converter to receive the test bytes, and coupled to the CDR circuit to receive the clock signal, and operating with the clock signal to compare two adjacent test bytes of the test bytes to determine whether the two adjacent test bytes are completely the same for testing the receiver;

wherein a bit number of each of the test bytes equals to a bit number of each of the test signal groups.

2. The receiver according to claim 1, wherein the two adjacent test bytes comprise a present test byte and a next test byte, and the test module comprises:

a data checking unit, for receiving the present test byte and the next test byte and comparing whether data of the corresponding bits of the present test byte and the next test byte is completely the same; and a counter, for recording an error record value corresponding to a number of the present test byte whose data differs from the data of the corresponding bits of the next test byte.

3. The receiver according to claim 2, wherein the test module further comprises:

a first buffer, for registering the present test byte; and a second buffer, for registering the next test byte.

4. The receiver according to claim 1, wherein the test signal groups are inputted from an outer apparatus to the receiver and have the same data content.

5. A signal testing method, applied to a receiver for receiving a plurality of test signal groups to test the receiver, each of the test signal groups having multi-bit of data, the signal testing method comprising:

obtaining a clock signal according to a transmitting frequency of the test signal groups;

converting the test signal groups into a plurality of test byte outputted in parallel, wherein each of the test byte has multi-bit of data; and comparing two adjacent test bytes of the test bytes in accordance with the clock signal to determine whether the two adjacent test bytes are completely the same for testing the receiver, wherein a frequency of the clock signal follows the transmitting frequency of the test signal groups received by the receiver, and a bit number of each of the test bytes equals to a bit number of each of the test signal groups.

6. The signal testing method according to claim 5, wherein the two adjacent test bytes comprise a preset test byte and a next test byte, the method further comprises:

respectively registering the present test byte and the next test byte;

comparing whether data of the corresponding bits of the present test byte and the next test byte is completely the same; and recording a number of the present test byte whose data differs from the data of the corresponding bits of the next text byte as an error record value.

7. The signal testing method according to claim 5, wherein after finishing comparing the two adjacent test bytes, the method further comprises outputting the former one of the two adjacent test bytes for continuously comparing the next two adjacent test bytes.

8. The signal testing method according to claim 5, wherein the test signal groups are inputted from an outer apparatus to the receiver and have the same data content.

9. A data testing system, comprising:

an outer apparatus, for transmitting a plurality of test signal groups; and a receiver, for receiving the test signal groups to test the receiver and obtaining a clock signal according to a transmitting frequency of the test signal groups, each of the test signal groups having multi-bit of data, the receiver comprising:

a serial-to-parallel converter, for receiving the test signal group and converting the serially-inputted test signal groups into a plurality of bytes outputted in parallel, wherein each of the test bytes has multi-bit of data; and a test module, for receiving the test bytes, and operating with the clock signal to compare two adjacent test bytes of the test bytes to determine whether the two adjacent test bytes are completely the same for testing the receiver, wherein a frequency of the clock signal follows the transmitting frequency of the test signal groups received by the receiver and a bit number of each of the test bytes equals to a bit number of each of the test signal groups.

10. The data testing system according to claim 9, wherein the receiver further comprises a CDR circuit for receiving the serially-inputted test signal groups and following a transmitting frequency of the test signal groups to obtain the clock signal for providing an operational frequency of the receiver.

11. The data testing system according to claim 9, wherein the two adjacent test bytes comprise a present test byte and a next test byte, and the test module comprises:

a data checking unit, for receiving the present test byte and the next test byte and comparing whether data of the corresponding bits of the present test byte and the next test byte is completely the same; and a counter, for recording an error record value corresponding to a number of the present test byte whose data differs from the data of the corresponding bits of the next test byte.

12. The data testing system according to claim 11, wherein the test module further comprises:

a first buffer, for registering the present test byte; and a second buffer, for registering the next test byte.

13. The data testing system according to claim 9, wherein the test signal groups are inputted from an outer apparatus to the receiver and have the same data content.

* * * * *